United States Patent
Shimada

(10) Patent No.: US 10,204,250 B2
(45) Date of Patent: Feb. 12, 2019

(54) MEDIUM CONTAINING IDENTIFIER

(71) Applicant: SIGMA P.I. CO., LTD., Osaka (JP)

(72) Inventor: Yoshitaka Shimada, Osaka (JP)

(73) Assignee: SIGMA P.I. CO., LTD., Osaka (JP)

(*) Notice: Subject to any disclaimer, the term of this patent is extended or adjusted under 35 U.S.C. 154(b) by 0 days.

(21) Appl. No.: 15/739,739

(22) PCT Filed: Jun. 24, 2016

(86) PCT No.: PCT/JP2016/068792
§ 371 (c)(1),
(2) Date: Dec. 24, 2017

(87) PCT Pub. No.: WO2016/208708
PCT Pub. Date: Dec. 29, 2016

(65) Prior Publication Data
US 2018/0189531 A1 Jul. 5, 2018

(30) Foreign Application Priority Data
Jun. 26, 2015 (JP) .................... 2015-128723

(51) Int. Cl.
*G06K 7/10* (2006.01)
*G06K 19/06* (2006.01)
(Continued)

(52) U.S. Cl.
CPC ......... *G06K 7/10722* (2013.01); *B42D 25/20* (2014.10); *B42D 25/21* (2014.10);
(Continued)

(58) Field of Classification Search
CPC .................................. G06K 7/10722
(Continued)

(56) References Cited

U.S. PATENT DOCUMENTS

| 5,189,292 A | 2/1993 | Batterman et al. |
| 5,880,451 A * | 3/1999 | Smith ................ G06K 7/14 235/462.1 |

(Continued)

FOREIGN PATENT DOCUMENTS

| JP | 9-52605 A | 2/1997 |
| JP | 2005-062165 A | 3/2005 |

(Continued)

OTHER PUBLICATIONS

International Search Report for PCT/JP2016/068792 dated Jul. 19, 2016.
(Continued)

*Primary Examiner* — Allyson Trail
(74) *Attorney, Agent, or Firm* — Kenealy Vaidya LLP

(57) ABSTRACT

The objective of the present invention is to effectively prevent fraud, theft, and the like occurring with respect to a medium manufactured from a source material. This medium is a medium that is cut into a prescribed shape from a source material on which an identifier capable of specifying a location and capable of being read by a reading device is attached at a corresponding location. The prescribed location on the medium is specified as an authentication location enabling recognition of the medium, and at least a portion of the identifier capable of specifying the prescribed location is set as an identifier of the medium.

3 Claims, 6 Drawing Sheets

(51) Int. Cl.
| | |
|---|---|
| *G09F 3/00* | (2006.01) |
| *B42D 25/305* | (2014.01) |
| *B42D 25/405* | (2014.01) |
| *B42D 25/30* | (2014.01) |
| *B42D 25/475* | (2014.01) |
| *B42D 25/20* | (2014.01) |
| *B42D 25/28* | (2014.01) |
| *B42D 25/21* | (2014.01) |

(52) U.S. Cl.
CPC ............ *B42D 25/28* (2014.10); *B42D 25/30* (2014.10); *B42D 25/305* (2014.10); *B42D 25/405* (2014.10); *B42D 25/475* (2014.10); *G06K 19/06* (2013.01); *G06K 19/06009* (2013.01); *G09F 3/00* (2013.01)

(58) Field of Classification Search
USPC .......... 235/472.01, 375, 487; 340/541, 573.1
See application file for complete search history.

(56) References Cited

U.S. PATENT DOCUMENTS

| | | | | |
|---|---|---|---|---|
| 8,708,221 | B1* | 4/2014 | Sprague | G06Q 10/08 235/375 |
| 2005/0258234 | A1 | 11/2005 | Silverbrook et al. | |
| 2006/0098842 | A1* | 5/2006 | Levine | G06Q 10/08 382/101 |
| 2009/0095047 | A1* | 4/2009 | Patel | G06K 7/10722 73/1.01 |
| 2009/0179072 | A1* | 7/2009 | Szesko | G06F 19/3462 235/375 |
| 2009/0309722 | A1* | 12/2009 | Nichols | G06Q 10/08 340/541 |
| 2011/0116681 | A1* | 5/2011 | Simske | G06K 9/00 382/100 |
| 2013/0301870 | A1* | 11/2013 | Mow | G06T 1/0021 382/100 |
| 2014/0042229 | A1* | 2/2014 | Tsai | G06K 7/1417 235/462.09 |
| 2014/0216982 | A1* | 8/2014 | Boyer | B65D 85/00 206/758 |
| 2014/0317005 | A1* | 10/2014 | Balwani | G06Q 10/0832 705/317 |
| 2016/0267312 | A1* | 9/2016 | Vasic | G06K 7/1417 |
| 2017/0139403 | A1* | 5/2017 | Saitou | G05B 19/406 |
| 2018/0048699 | A1* | 2/2018 | Van Wagenen | H04L 67/08 |
| 2018/0089616 | A1* | 3/2018 | Jacobus | G06Q 10/087 |
| 2018/0124571 | A1* | 5/2018 | Kokkonen | G05D 1/028 |

FOREIGN PATENT DOCUMENTS

| | | |
|---|---|---|
| JP | 2006-244055 A | 9/2006 |
| JP | 2008-501201 A | 1/2008 |
| JP | 2012-56602 A | 3/2012 |
| KR | 20080040441 A | 5/2008 |
| WO | 2005/111922 A1 | 11/2005 |
| WO | 2009/123002 A1 | 10/2009 |
| WO | 2012025414 A1 | 3/2012 |

OTHER PUBLICATIONS

Japanese Office Action for the related Japanese Patent Application No. 2015-128723 dated Aug. 14, 2018.
Supplementary European Search Report for the related European Patent Application No. 16814477.2 dated Apr. 30, 2018.
Office Action from European Patent Office for the related European Patent Application No. 168144772 dated May 25, 2018.

* cited by examiner

MEDIUM CONTAINING IDENTIFIER

TECHNICAL FIELD

The present invention relates to a medium containing an identifier.

BACKGROUND ART

Heretofore, paper boxes have been used as packaging for products such as medicines and the like. A paper box is manufactured from a source material and a serial code or serial number is applied to the paper box (for example, see Patent Document 1).

Patent Document 1: Japanese Unexamined Patent Application (Translation of PCT Application), Publication No. 2008-501201

DISCLOSURE OF THE INVENTION

Problems to be Solved by the Invention

Conventionally, however, a serial code or serial number is applied during shipping or the like in a process separate from the process of manufacturing of the packaging of a product; the serial code or serial number is added to the packaging or the like (attached as a sticker or printed). Therefore, if counterfeiters can obtain serial codes or serial numbers, simply printing the serial codes or serial numbers on counterfeit products and packaging may be facilitated and it is not possible to effectively prevent the spread of frauds in which counterfeit products have legitimate serial codes or serial numbers.

Furthermore, there are many cases of loss in which some of the source material that is the origin of packaging is stolen and used for packaging of counterfeit products; effective countermeasures against these losses have not been available.

Such fraud, theft and the like occurs with respect not just to packaging of products but also to media that are manufactured from source materials in general.

The present invention has been made in consideration of these circumstances; an object of the present invention is to effectively prevent fraud, theft and the like occurring with respect to a medium manufactured from a source material.

Means for Solving the Problems

A medium according to an aspect of the present invention is a medium containing an identifier, wherein the identifier is capable of specifying a location, the identifier is readable by a reading device, the medium is cut to a prescribed shape from a source material to which the identifier is applied at a corresponding location, a prescribed location of the medium is specified as an authentication location by which the medium is recognized, and at least a portion of the identifier, which portion is capable of specifying the prescribed location, is set as an identifier of the medium.

Prescribed printing may be printed in a prescribed range containing the authentication location so as to cover the identifier.

A plurality of the prescribed location may be available as candidates for the authentication location, and a rule for selecting the authentication location from the plurality of candidates may set the authentication location in association with the identifier of the medium.

Effects of the Invention

According to the present invention fraud, theft, and the like of a medium manufactured from a source material may be effectively prevented from occurring.

PREFERRED MODE FOR CARRYING OUT THE INVENTION

Herebelow, an embodiment of the present invention is described with reference to the attached drawings.

Figure 1:
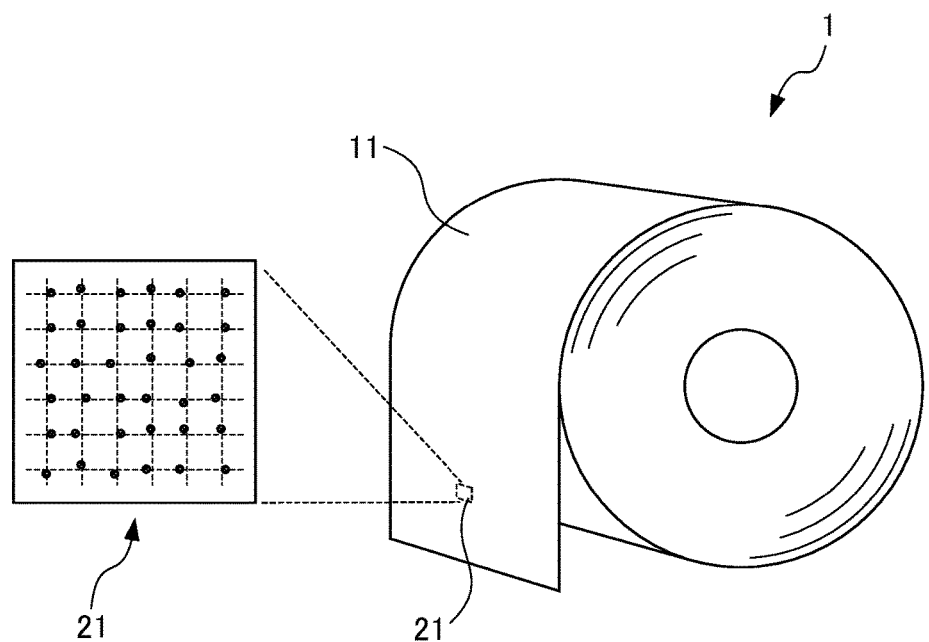
FIG. 1 is a view depicting an example of external structure of a source material that is the base of a medium in which the present invention is employed.

FIG. 1 depicts an example of external structure of a source material 1 that is the base of a medium in which the present invention is employed.

The source material 1 has a structure in which a medium 11 in sheet form is wound into a roll.

The material of the medium 11 is not particularly limited. Arbitrary materials such as paper, metal (aluminum, copper or the like) and the like may be employed.

Identifiers 21 are applied evenly over the whole surface of the medium 11. To be specific, the identifiers 21 are identifiers that are capable of specifying locations and that are readable by a reading device (not shown in FIG. 1). Each identifier 21 is applied to a corresponding location of the medium 11 (a location of the medium 11 that is specified by that identifier 21).

Thus, the identifier 21 that is applied to a prescribed location of the medium 11 can be read by a reading device and the location specified by this identifier 21 is the prescribed location.

It is sufficient if the identifiers 21 have the functionality described in this paragraph; types and formats of the identifiers 21 are not particularly limited.

Figure 2:
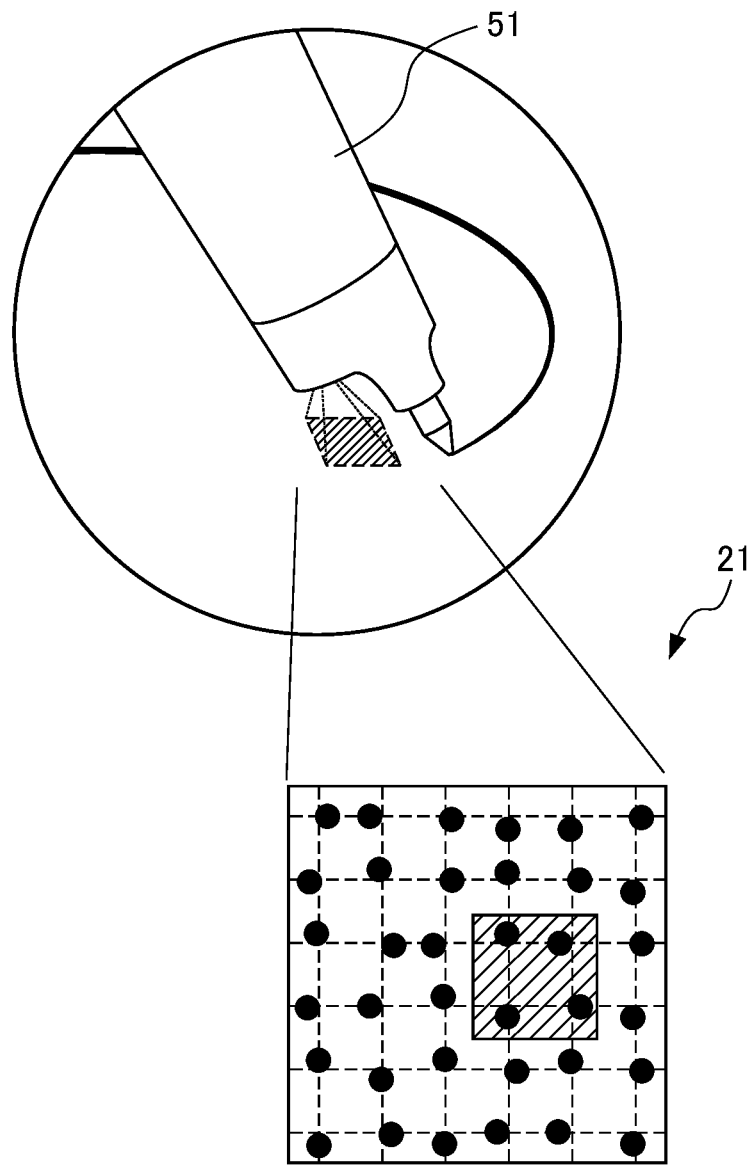
FIG. 2 is a schematic view presenting a format of identifiers according to a present embodiment.

FIG. 2 is a schematic diagram presenting the format of the identifiers 21 according to the present embodiment.

As illustrated in FIG. 2, in the present embodiment each identifier 21 is constituted by a dot pattern (a coded pattern).

A region with a prescribed shape containing a prescribed number of dots (in the present example, the square region depicted in FIG. 2) serves as a unit area. Prescribed dot patterns are unique identifiers 21 that are associated with corresponding unit areas. Each unique identifier 21 contains information capable of specifying the location on the medium 11 of the unit area (the square region) in which the identifier 21 is disposed.

A pen 51 constituting at least part of a reading device is equipped with a pen tip portion, an ordinary ink cartridge for writing characters and the like and, in addition, a miniature camera for imaging the dot patterns applied to the medium 11.

The pen 51 is equipped with a processor that extracts the identifiers 21 associated with unit areas from imaged dot patterns.

A data communications unit is installed in the pen 51. The data communications unit sends the extracted identifiers 21 to external equipment (for example, an authenticity determination device 101, which is described below).

Thus, when the dot pattern of a unit area of the medium 11 is read by the pen 51, the identifier 21 associated with the unit area is extracted and sent to the external equipment by the pen 51.

The location of the medium 11 at which this unit area is disposed can be specified from the identifier 21. Therefore, even if a region containing this unit area has been cut and separated from the medium 11 (the source material 1), the original location on the medium 11 (the source material 1) at which the unit area was disposed can be specified.

Figure 3:
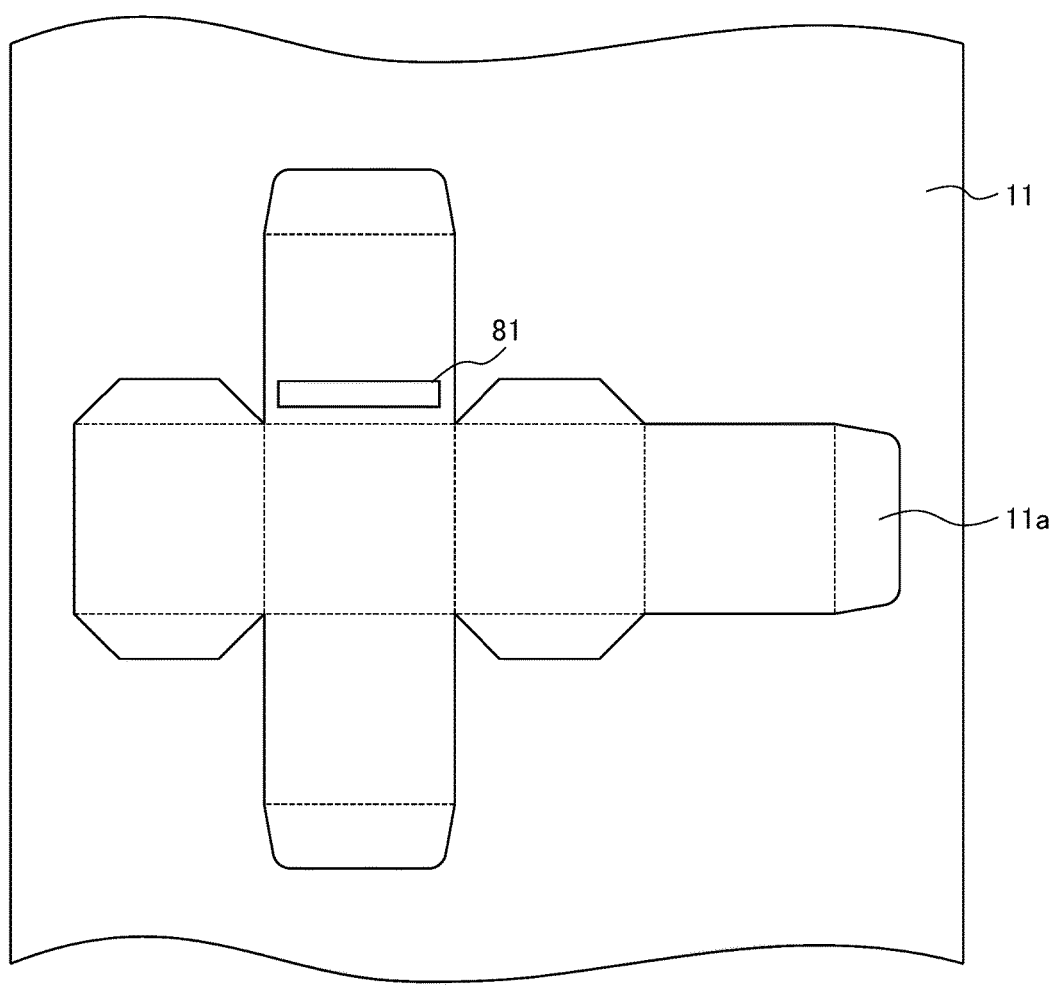
FIG. 3 is a view depicting a state before cutting of the medium in which the present invention is employed.
Figure 4:
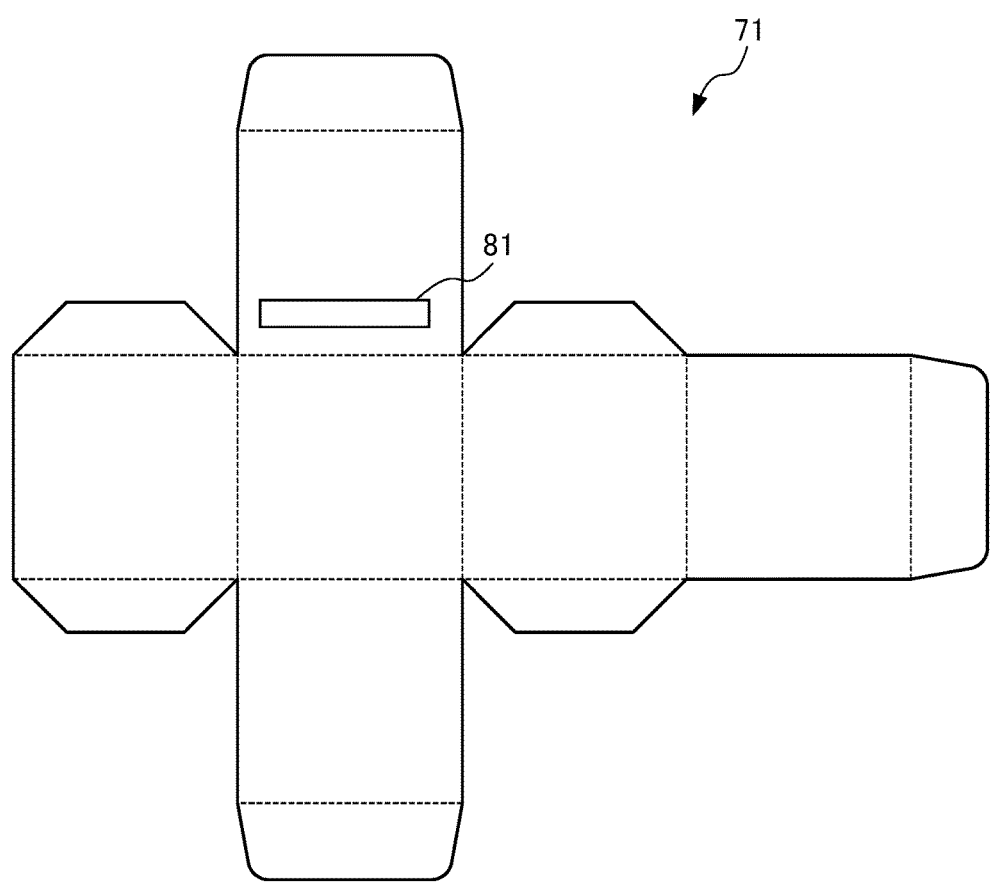
FIG. 4 is a view depicting a state after cutting of the medium in which the present invention is employed.

FIG. 3 is a view depicting a state before cutting of the medium in which the present invention is employed. FIG. 4 is a view depicting a state after the cutting of the medium in which the present invention is employed.

In the present embodiment, a medium 71 as illustrated in FIG. 4 is produced by cutting a part 11a with a prescribed shape (the shape of an unfolded view of a box) from the medium (the source material 1) as illustrated in FIG. 3.

Thus, the medium 11 forming the source material 1 differs from the medium 71 into which the part 11a with the prescribed shape of the medium 11 is cut (i.e., the medium 71 cut from the medium 11).

That is, the meaning of the term "medium 71" includes a medium with a prescribed shape that is separated from the medium 11 (the source material 1) in order to perform a prescribed function. The medium 71 may be subjected to appropriate treatments and modifications in order to perform the prescribed function.

Figure 5:
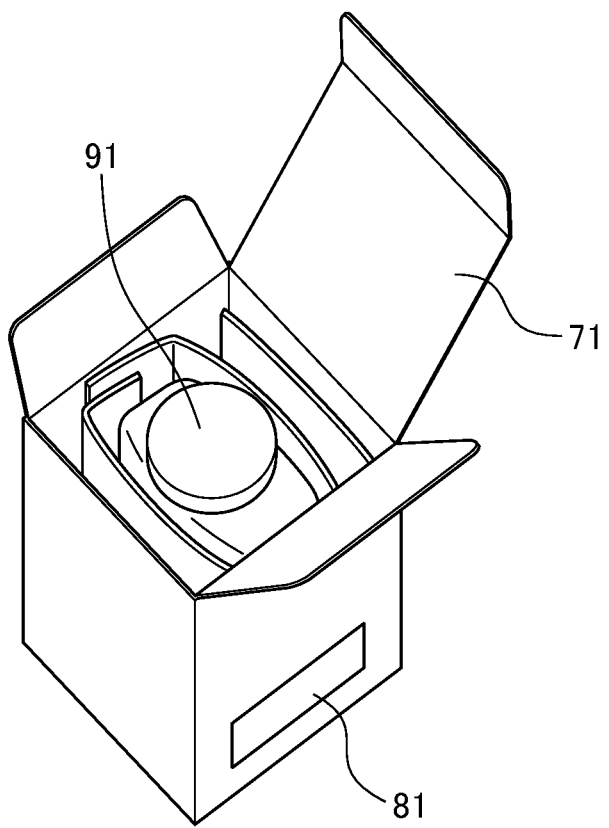
FIG. 5 is a view depicting an example of external structure of a box formed of the medium in FIG. 4.

In the present embodiment, the medium 71 is cut and separated from the source material 1 in the shape of an unfolded view of a box (packaging) in order to perform the function of packaging of a prescribed product (a medicine or the like). Hence, consequent to being assembled, the medium 71 structures a box (packaging) as illustrated in FIG. 5 and functions as packaging of a product 91 by enclosing the product 91.

Conventionally, a unique serial code or serial number would be applied to the product 91 or the packaging.

Conventionally, however, the serial code or serial number is applied during shipping or the like in a process separate from processes of manufacturing of the product 91 and the packaging; the serial code or serial number is added to the product 91, the packaging or the like (attached as a sticker or printed). Therefore, if counterfeiters can obtain serial codes or serial numbers, simply printing the serial codes or serial numbers on counterfeit products and packaging may be facilitated and it is not possible to effectively prevent the spread of frauds in which counterfeit products have legitimate serial codes or serial numbers.

Furthermore, there are many cases of loss in which some of the source material that is the origin of packaging has been stolen and used for packaging of counterfeit products; effective countermeasures against these losses have not been available.

In order to solve this problem, in the present embodiment, as illustrated in FIG. 3, an arbitrary location 81 of the part 11a of the medium 11 of the source material 1 that constitutes the medium 71 is specified as a location for authentication with a serial code or serial number (below referred to as "the authentication location").

The identifier 21 applied at the authentication location 81 is a unique dot pattern as described above. The identifier 21 itself or a code of a portion thereof may be employed as a serial code or serial number.

Figure 6:
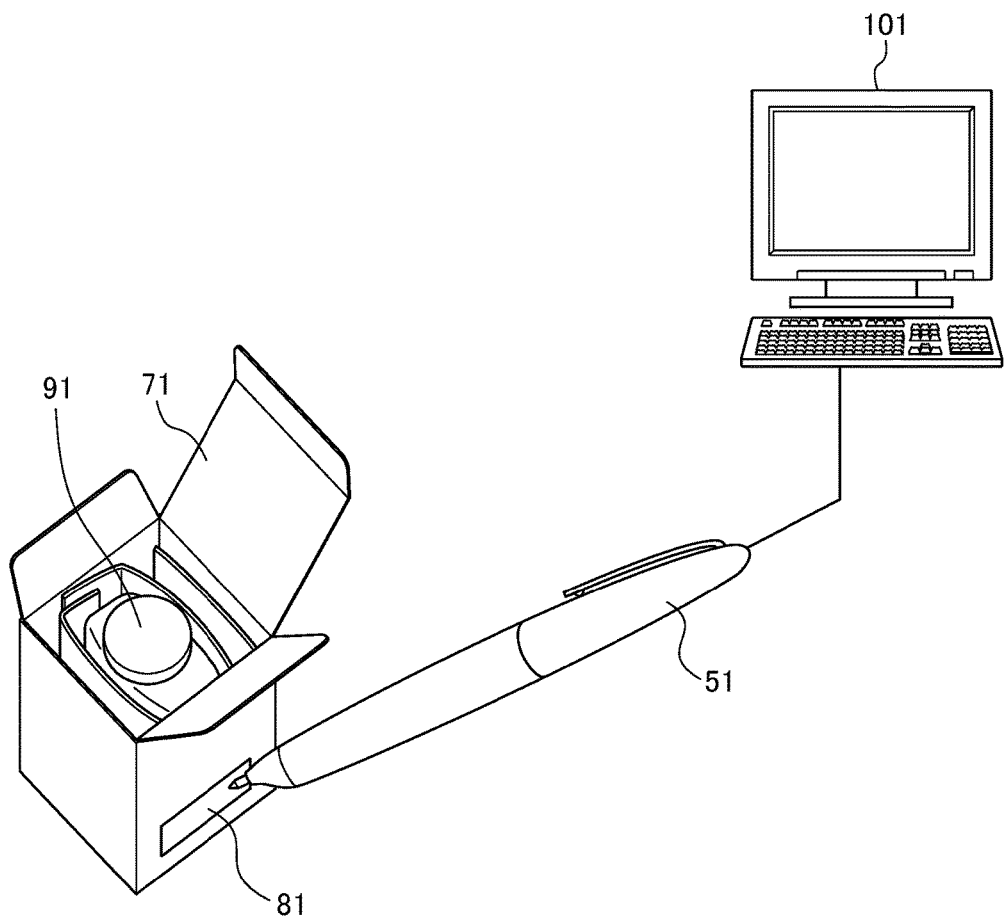
FIG. 6 is a view presenting a schematic of authentication by an authentication location of the box in FIG. 5.

FIG. 6 is a view presenting a schematic of authentication by the authentication location 81.

As illustrated in FIG. 6, when the pen tip of the pen 51 is brought close to the authentication location 81 of the medium 71 functioning as the packaging of the product 91, the identifier 21 is read by the pen 51 (the reading device) and sent to the authenticity determination device 101.

The authenticity determination device 101 is capable of specifying, from the identifier 21, location coordinates of the authentication location 81 on the medium 11 of the source material 1, and the serial code or serial number. Thus, the authenticity determination device 101 may authenticate the legitimacy of the product 91 and the packaging (the medium 71). That is, the authenticity determination device 101 may validate the authenticity of the product 91 and the packaging.

In this present embodiment, the process of attaching a serial code or serial number is effectively included in the process of manufacturing of the packaging of the product 91. Thus, a serial code or serial number can be derived only from a dot pattern (the identifier 21) uniquely applied to packaging (the medium 71).

That is, if a medium other than the medium 71 is used for packaging, unless the dot pattern applied to the medium 71 is reproduced, it is not possible to apply the same serial code or serial number. If some of the source material 1 is stolen and used for packaging of a counterfeit of the product 91, a dot pattern different from the dot pattern applied to the medium 71 (the identifier 21) will be used. Therefore, it will not be possible to reproduce the same serial code or serial number.

Thus, the spread of frauds in which the product 91 is counterfeited with a legitimate serial code or serial number may be effectively prevented.

Furthermore, a different dot pattern (the identifier 21) will be applied to the packaging of a counterfeit of the product 91. Therefore, which portion of the medium 11 of the source material 1 has been stolen may be identified by reading the different dot pattern (the identifier 21) with a reading device (the pen 51 or the like).

Thus, an effective countermeasure with respect to losses in which some of the source material 1 that is the origin of the packaging is stolen and used for packaging of counterfeits of the product 91 may be provided.

Further still, if, for example, there is a complaint relating to the product from a consumer, which portion of the medium 11 of the source material 1 the packaging (the box) was manufactured from may be traced by bringing the packaging of the product (the medium 71) and reading the dot pattern (the identifier 21) applied to the packaging with a reading device (the pen 51 or the like). Hence, the product (medicine) enclosed in the packaging (the box) may be easily traced (and how the product was manufactured, at which production site, and how the product was shipped may be traced).

Thus, quality management of the product may be facilitated. The medium 71 functions as the packaging of the product in the present embodiment. However, as described below, the medium 71 may function as a label, a tape (double-sided tape, metal tape or the like) to be affixed to a prescribed object, or any of various vouchers. In these cases, quality management of the tape affixed to the object, the voucher itself or the like may be facilitated.

It should be noted that the present invention is not limited to the embodiment described above, and any modifications and improvements thereto within a scope that can realize the object of the present invention are included in the present invention.

In other words, embodiments of the medium in which the present invention is employed are not particularly limited provided they take the following configuration. That is, it is sufficient if a medium in which the present invention is employed is a medium in which an identifier is capable of specifying a location, the identifier is readable by a reading device, the medium is cut to a prescribed shape from a source material to which the identifier is applied at a corresponding location, a prescribed location of the medium is specified as an authentication location by which the medium is recognized, and at least a portion of the identifier, which portion is capable of specifying the prescribed location, is set as an identifier (for example, a serial code or serial number) of the medium.

Herein, the meaning of the term "location" includes a position in n dimensions (n being an arbitrary integer that is at least 1). In the embodiment described above, n is set to 2 and two-dimensional coordinates of the surface of the medium 11 are employed as the location. However, n is not particularly limited to 2; n may be set to 1 and a length from an arbitrary point of the source material 1 may be employed as the location.

Note that if n=1 is employed, it is not particularly necessary to apply the identifiers 21 evenly over the whole surface of the medium 11. It is sufficient if the identifiers 21 are applied successively in the length direction (a long side direction of the medium 11).

Dot patterns are employed as the identifiers in the embodiment described above, but this is not particularly limiting. Identifiers of arbitrary formats and the like may be employed provided the identifiers are capable of specifying locations, the identifiers are capable of being read, and the identifiers can be applied to the medium.

In the embodiment described above, the medium 71 that is paper functioning as packaging of the product 91 is used as the medium in which the present invention is employed, but this is not particularly limiting. It is sufficient that the medium requires the application of identifiers. Mediums that are arbitrary materials performing arbitrary functions may be employed.

To be specific, as examples of materials apart from paper, arbitrary materials may be employed provided cutting thereof is possible, such as metals (for example, aluminum, copper or the like), plastics and the like.

Further, as examples of functions performed by the medium, apart from the function of packaging in the embodiment described above, arbitrary functions may be employed, such as labels, tapes (double-sided tape, metal tape or the like) to be affixed to prescribed objects, various vouchers, and the like.

In the embodiment described above, the authentication location 81 employed as the authentication location of the medium is an authentication location that may be identified by a third party. In this situation, if the identifiers 21 (dot patterns) applied to the authentication location 81 can be reproduced by the third party, reproduction of the identifiers may be possible.

Therefore, it is important in regard to security to prevent third parties from being aware of the presence of the authentication location as far as possible.

Accordingly, a medium may be employed in which printing is printed in a prescribed range containing the authentication location so as to cover the identifier.

Thus, because prescribed printing (a product description, a logo or the like) is printed over the identifier at the authentication location, it is difficult for a third party to identify the authentication location visually. As a result, the security level is further improved.

Alternatively, a plurality of the prescribed location may be available as candidates for the authentication location, and a rule for selecting the authentication location from the plurality of candidates may set the authentication location in association with the identifier of the medium.

Thus, it is difficult for a third party who does not know the rule to identify which of the authentication location candidates that can be read by a reading device is the authentication location. As a result, the security level is further improved.

EXPLANATION OF REFERENCE NUMERALS

1 . . . Source material
11 . . . Medium
71 . . . Medium
81 . . . Authentication location
91 . . . Product
21 . . . Identifier
51 . . . Pen
101 . . . Authenticity determination device

The invention claimed is:

1. A medium which is cut to a prescribed shape from a source material comprising:
a plurality of identifiers each configured to specify a location on the source material and to be readable by a reading device, the identifiers being disposed on the source material, wherein
at least a region of the medium is configured to be used as an authentication location by which the medium is recognized, and
at least a portion of the identifiers, which are configured to specify the region of the medium, is set as a working identifier of the medium.

2. The medium according to claim 1, wherein printing is performed in a prescribed range containing the authentication location so as to cover the working identifier of the medium.

3. The medium according to claim 1, wherein the at least a region of the medium comprises a plurality of regions of the medium which are available as a plurality of candidates for the authentication location, and
a rule for selecting the authentication location from the plurality of candidates is defined in association with the identifiers of the medium.

* * * * *